Inventor
H. KANEKO
By [signature]
Attorney

United States Patent Office 3,377,586

Patented Apr. 9, 1968

3,377,586

DECODER WITH BIPOLAR-HYPERBOLIC COMPANDING CHARACTERISTICS

Hisashi Kaneko, Tokyo, Japan, assignor to Nippon Electric Company, Limited, Tokyo, Japan, a corporation of Japan Filed Mar. 3, 1965, Ser. No. 436,882
Claims priority, application Japan, Mar. 12, 1964, 39/13,730
17 Claims. (Cl. 340—347)

Figure 1:
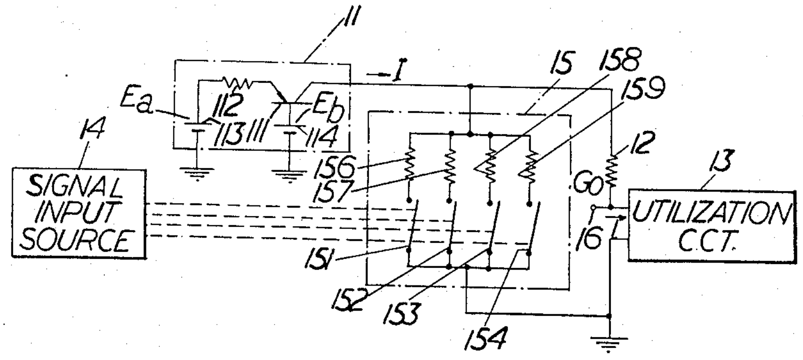

This invention relates to a decoder, used in pulse code modulation (PCM) communication and to a digital-analogue converter having a hyperbolic quantization or companding characteristic, for converting digital signals into analogue signals. Consequently, this invention al relates to an encoder used in PCM communication and an analogue-digital converter of the feedback or a similar type wherein the above-mentioned digital analogue converter is used as the local decoder.

Conversion of analogue signals into digital signals by sampling, quantizing, and encoding said analogue signals (which may represent analogue quantities such as voice, picture, data, etc.) can provide substantial technical advantages such as less susceptibility to noise in the transmission and handling of information. Analogue signals (or sampled analogue signals) have generally been quantized with equal quantization steps. However, some analogue signals, such as voice signals, in which small amplitude signals frequently occur (based on probability) are preferably quantized with smaller quantization steps for signals of small amplitude and with the usual larger quantization steps for large amplitude signals. During non-linear quantization, the analogue signals are first compressed or expanded (companded) by an instantaneous compander, in which the inherent non-linearity of a non-linear circuit element (such as semiconductor devices or vacuum tubes) are utilized, and then the companded signals are quantized linearly. With this type non-linear quantization (whose characteristics depend on the inherent non-linearity of non-linear circuit element) it has been impossible to obtain uniform non-linear quantization or companding characteristics because the inherent non-linearities of said devices are temperature dependent.

In order to overcome the above-mentioned defects of conventional devices; decoders with logarithmic, hyperbolic or with other non-linear companding characteristics have been previously proposed. Such a decoder would include: a passive network composed of resistors or other passive circuit elements and a switch, responsive to the digit codes of a digital signal. A decoder having logarithmic companding characteristics is disclosed in my copending patent application filed in the United States on Oct. 4, 1963, S.N. 314,765, now Patent No. 3,296,611, entitled "Decoding Circuit With Non-Linear Companding Characteristics" and assigned to the same assignee as the present invention. In said copending application a constant-voltage power source and a plurality of cascaded resistor-attenuators are provided. The attentuation given by each of said attenuators is controlled by each of the digit codes of the digital signal so that the decoder produces an analogue signal which is companded logarithmically. Some examples of decoders with hyperbolic companding characteristics are revaled at the end of an article contributed by D. B. Smith on pages 1053–1058 of the Proc. I.R.E., vol. 41, No. 8 (August 1953).

All these proposed decoders with non-linear companding characteristics are constructed so that the impedance of a resistor network or other passive network varies in accordance with the corresponding digit code of a digital signal. Thus, these decoders produce the decoded output as an open-circuit voltage. Therefore, these decoders are not preferred when the output-signal utilization circuit connected across the output terminal pair of the decoder has very low input impedance.

For this case, a decoder having a hyperbolic companding characteristic was proposed in my copending application, S.N. 342,470, now Patent No. 3,336,589 filed on Feb. 4, 1964, and assigned to the assignee of the present invention. Said decoder is arranged so that the admittance of the passive networks can vary in response to the respective digit codes of the digital signal and the decoded output can be obtained as a short-circuit current. However, the proposed weighted-admittance-switch circuit for varying the admittance according to the digit codes is not directly grounded at any of its terminals, rather one of its terminal pair is connected to the constant-voltage power source. Consequently, the level of the digital signal must be above a certain level and this requires complicated construction for the switch-controlling circuit. Furthermore, if the digital signal represents an analogue signal which has both positive and negative components, such as a voice signal, the switch-controlling circuit must be even more complicated because of the necessity to provide an additional circuit for reversing the polarity of the voltage supplied from the constant-voltage power source in accordance with the polarity of the digital signal.

In order to remove the above-mentioned defects, another decoder was proposed which provides partial decoders, each of which has a constant-voltage power source, a linearly-variable-admittance network, and a fixed admittance network. The variable-admittance network is not interposed in the main current path of the partial decoder but rather is connected to the junction of the power source and the fixed-admittance network so as to serve as a shunt to ground. The constant-voltage power source in this proposed decoder, however, is not efficiently utilized because each partial decoder consumes a relatively large amount of power in the fixed-admittance network contained in the main path of the current. As a result, the decoder as a whole wastes large amounts of power and the constant-voltage power source is thus used only at very low efficiency.

The object of this invention is therefore to provide a decoder wherein the power source is used very efficiently and the linearly-variable-admittance network is simple in construction.

A more particular object of the invention is to provide a decoder which comprises a highly stable and easily reversible constant-current power source having common-base-type transistor circuitry, and a linearly-variable-admittance network and wherein the power source is efficiency utilized and the switches are readily controlled.

This invention is based on the dual discovery that a constant-current power source having common-base-type transistor circuitry is the best power source for a decoder of this type and that the combination of a reversible constant-current power source including the above-mentioned constant-current power source and a linearly-variable-admittance network is also most efficient for this type of decoder.

Figure 2:
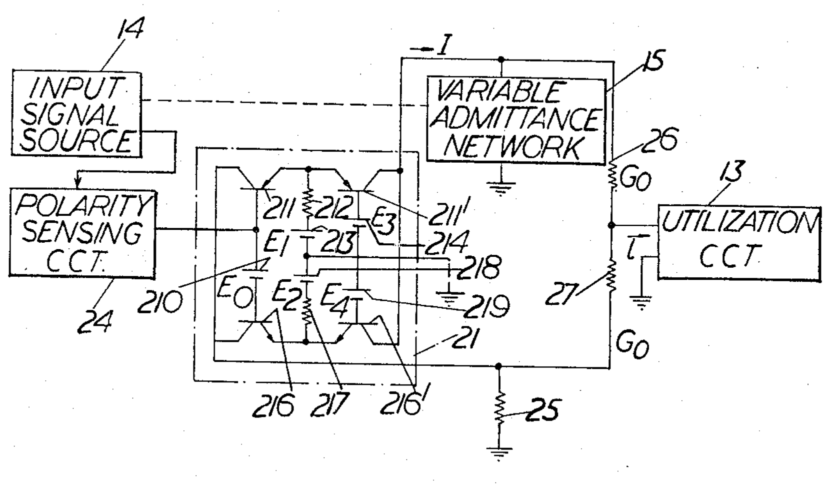

The above-mentioned and other features and objects of this invention and the means for attaining them will become more apparent and the invention itself will be best understood by reference to the following descriptions of embodiments of the invention taken in conjunction with the accompanying drawings in which:

FIG. 1 is a circuit diagram of a decoder having hyperbolic companding characteristics which will illustrate the principle of this invention; and FIG. 2 is a circuit diagram of an embodiment of the invention.

Referring to FIG. 1, the decoder illustrated therein includes a series circuit consisting of a constant-current power source 11, a fixed-admittance element 12, and an output-signal utilization circuit 13. A variable-admittance network 15 connects the junction of the power source 11 and the fixed-admittance element 12 to ground. Network 13 is controlled, in the manner to be described hereinafter, by the digital or other encoded signal supplied from a signal input source 14. The variable-admittance network includes: switches 151, 152, 153, and 154, which may be the contacts of electromagnetic or electronic relays. Each switch assumes the "0" or "1" state in accordance with the corresponding code digit of a four-bit binary codeword ($e_1$, $e_2$, $e_3$, $e_4$) signal supplied from the signal source 14. The "1" and "0" output may represent a mark or space. Each relay has a contact connected, to ground. The fixed-admittance elements 156, 157, 158 and 159 are provided with admittances $g/2$, $g/2^2$, $g/2^3$, and $g/2^4$, respectively. Each admittance is connected, at one end, thereof to the ungrounded contact of the corresponding switch and, at the other end thereof to the junction between the power source 11 and the fixed-admittance element 12 so that the shunt formed by the variable-admittance network 15 controls the current supplied from the power source 11 through the fixed-admittance element 12 to the output-signal utilization circuit 13.

If the binary codeword ($e_1$, $e_2$, $e_3$, $e_4$) of the input digital signal is (1011), then only switch 152 is in the "1" state (closed) while the other switches 151, 153, and 154 are in the "0" state and are open in the manner shown. As a result, the admittance G of the variable-admittance network 15 is equal to $g/2^2$. Generalizing this result, it is found that the digital quantity $j$ of a codeword ($e_1$, $e_2$, $e_3$, $e_4$) of the input digital signal is given by:

$$j=\sum_{k=1}^{4} e_k \cdot 2^{-k} \tag{1}$$

It follows that the variable admittance G of the variable-admittance network 15 is given by:

$$G=g.\bar{j} \tag{2}$$

Equation 2 is the product of a preselected admittance $g$ and the difference $\bar{j}$ obtained when the digital quantity $j$ given by Equation 1 is subtracted from the maximum value $(2^4-1)/2^4$ of the digital quantity $j$, or $$\bar{j}=(2^4-1)/2^4-j=\sum_{k=1}^{4}(1-e_k)\cdot 2^{-k} \tag{3}$$

Thus, it is seen that the admittance G is linearly proportional to the difference $\bar{j}$ and consequently to the digital quantity $j$ given by the binary codeword ($e_1$, $e_2$, $e_3$, $e_4$). This clearly indicates that the variable-admittance network 15 is a linearly-variable-admittance network.

The constant-current power source 11 includes transistor 111. A series circuit consisting of a stabilizing resistor 112 and a power source 113 supplying a voltage $E_a$, is connected to the emitter of transistor 111. A bias-voltage source 114 supplies a bias voltage of $E_b$ to the base of the transistor 111. The collector of the transistor 111 is connected to the variable-admittance network 15.

If I represents the current flowing from the collector of transistor 111 in the power source 11 to the junction of the fixed-admittance element 12 and the variable-admittance network 15, the current $i$ flowing through the output signal utilization circuit 13 will be given by:

$$i=I.G_0/(G+G_0) \tag{4}$$

where $G_0$ is the admittance of the fixed-admittance element 12. Equation 4 may be modified by normalizing the digital quantity $j$ given by Equation 1 with the maximum value $(2^4-1)/2^4$ of the digital quantity $j$ to introduce a new variazle $x$ given by $$x=j/[(2^4-1)/2^4]=\sum_{k=1}^{4} e_k \cdot 2^{4-k}/(2^4-1) \tag{5}$$

If the maximum value of the variable admittance G (corresponding to the value $2^4-1)/2^4$) for the digital quantity $\bar{j}$ is represented by $g_m$ where:

$$g_m=(2^4-1)g/2^4 \tag{6}$$

then the variable admittance G can be defined as follows:

$$G=g.\bar{j}=g_m.(1-x) \tag{7}$$

Equation 4 then becomes:

$$\begin{aligned} i &= I.[G_o/(g_m\cdot(1-x)+G_o)] \\ &= [hI/(1+h)]\cdot[x/(1+h\cdot(1-x)]+I/(1+h) \\ &= [hI/(1+h)]\cdot[x/(1+h(-hx)]+I/1+h) \end{aligned} \tag{8}$$

where the compression parameter $h$ is defined as:

$$h=g_m/G_0 \tag{9}$$

and is the degree of compression, which is ordinarily set at a value in the order of twenty for non-linear encoding of speech signals. It should be noted that the direct-current component represented by the second term of the right-hand side of Equation 8 must be cancelled so that the current $i$ may be expressed as a hyperbolic function of the variable $x$. For this purpose, an input terminal 16 of the output-signal utilization circuit 13 is supplied from a compensation circuit or biasing current source (not shown) with a biasing or compensating current for cancelling or compensating for the direct-current component $I/(1+h)$.

If the resistances of the admittance elements 156, 157, 158 and 159 are 100, 200, 400, and 800 ohms, respectively, then the value of $g_m$ will be approximately twenty milliohms. Thus, if twenty is selected for the degree of compression $h$, the fixed admittance $G_0$ will be about one milliohm and the resistance of the fixed-admittance element 12 will be about one kilohm. If the voltages $E_a$ and $E_b$ are fifteen volts and five volts, respectively, and the resistance of resistor 112 is two kilohms, then the current I will be about five milliamperes. Thus, the amplitude of the hyperbolic characteristics given by an $hI/(1+h)$ in brackets in the first term of the right-hand side of Equation 8 will be $$5 \text{ milliamperes} \times [20/(20+1)]=4.76 \text{ milliamperes}$$

The biasing current $I/(1+h)$ similarly will be about 0.25 ma. This biasing current is so small that it scarcely introduces any drift into the output current even if the biasing current source has poor stability.

If this device is used as the local decoder of a feedback encoder, then the nature of the analogue signal to be encoded must also be taken into consideration. If the analogue signal can assume both positive and negative values as speech signals do, then the decoder illustrated in FIG. 1 must be further modified. Furthermore, if the input digital signal not only has digits for representing the analogue quantity of the information signal but also has a polarity-representing digit for representing whether the analogue signal is positive or negative, then the decoder must respond to the polarity-representing digit. In other words, it is possible to use the uni-directional compensating current defined by the second term of the right-hand side of Equation 8 only as long as no consideration is given to the polarity of the digital signal representing the analogue information signal. However, it will be necessary to alter the polarity of the compensating current when the polarity of the analogue quantity must be taken into account.

Referring now to FIG. 2, there is illustrated therein, an embodiment of the invention which will alter the polarity of the compensating current. FIG. 2 includes an output signal utilization circuit 13, a signal source 14, and a variable-admittance network 15. These elements are similar to the corresponding elements in the decoder of FIG. 1 and are designated by the same reference numerals. FIG.

2 also includes a reversible constant-current power source 21 corresponding to the constant-current power source 11 and a polarity-discriminating circuit 24 for determining the polarity of the polarity digit contained in the digital signals supplied from the signal source 14. Circuit 24 determines the polarity of the analogue signal represented by each codeword. A fixed-admittance network 25 is provided which corresponds to the variable-admittance network 15 and has the admittance $g_m$ and is grounded at an end thereof. The fixed admittance elements 26 and 27 are provided, each of which corresponds to the fixed-admittance element 12, which has the admittance $G_0$. Elements 26 and 27 are disposed between the networks 15 and 25, on the one hand, and the output signal utilization circuit 13, on the other hand.

In this circuit the signal source 14 supplies a digital signal which contains not only the digits representing the amplitude of the analogue quantity of the information signal but also one polarity-representing digit for representing the polarity of the analogue quantity. The digital signal is supplied to control the variable-admittance network 15 as illustrated in FIG. 1 and is also supplied to the polarity-sensing circuit 24. The polarity-sensing circuit 24, for example, may be an AND circuit or a gating circuit which selectively responds only to the polarity-representing digit signal supplied from the signal source 14 and derives a control signal indicating whether the analogue quantity of the information signal is positive or negative. This control signal is also supplied to the reversible constant-current power source 21.

The reversible constant-current power source 21 includes the p-n-p transistors 211 and 211′. The emitters of these transistors are connected through a common resistor 212 to the positive terminal of a power source 213 which supplies the electromotive force of $E_1$. The n-p-n transistors 216 and 216′ have their emitters likewise connected through a common resistor 217 to the negative terminal of another power source 218 which supplied an electromotive force $E_2$. The base of transistor 211′ is connected to the positive terminal of a voltage source 214 which supplies an electromotive force $E_3$. The base of transistor 216′ is connected to the negative terminal of another voltage source 219 which supplies an electromotive force $E_4$. The bases of transistors 211 and 216 are connected to the positive and the negative terminals of still another voltage source 210, which supplies an electromotive force $E_0$. The control pulse from the polarity sensing circuit 24 is supplied to the junction of the base of the transistor 211 and the positive terminal of the voltage source 210. The control pulse will be higher or lower than a reference potential by a predetermined amount which is preset by the voltage $E_3$ of the voltage source 214. The amplitude of the control pulse will vary with the polarity of the polarity-representing digit. This control pulse serves to reverse the polarity of the reversible power source 21. Thus, when the polarity-representing digit is to represent a positive value and the control pulse is a trigger pulse which is positive with respect to the reference potential (hereinafter called a positive trigger pulse), this trigger pulse will be applied to the base of the transistor 211 to cut-off said transistor. As a result, the current flowing through the resistor 212 decreases. Therefore, the emitter potential of the transistor 211′ increases which in turn turns "ON" transistor 211′ and causes a positive current to flow towards the variable-admittance network 15. It should be noted here that the $E_0$ supplied by voltage source 210 should be substantially equal to the sum of $E_3$ supplied by source 214 and $E_4$ supplied by voltage source 219. Consequently, the positive trigger pulse raises the potential at the base of the transistor 216 above a reference voltage determined by $E_4$ supplies by voltage source 219. This positive trigger pulse turns "ON" transistor 216 and increases the current flowing through resistor 217. This in turn raises the emitter potential of the transistor 216′ to cut-off transistor 216′ which cuts off the negative current or the current which was flowing from the variable-admittance circuit 15. In short, a positive trigger pulse changes the negative power current which flows through the variable-admittance network 15, into a positive current. At the same time, the positive compensating current which may have been flowing through the fixed-admittance network 25, the fixed-admittance element 27, and the output-signal utilization circuit 13 before the appearance of the positive trigger pulse is reversed to a negative compensating current.

When the polarity-representing digit represents a negative value and the control pulse is a negative trigger pulse which is negative with respect to the reference voltage (hereinafter called a negative trigger pulse) the trigger pulse operates to reverse the operations caused by the positive trigger pulse. Thus, the negative trigger turns "ON" transistors 211 and 216′ and turns "OFF" transistors 211′ and 216′. Consequently, the positive current and the negative compensating current which might have been flowing through the variable-admittance network 15 before the appearance of the negative trigger pulse, are reversed by the negative trigger pulse.

Generallizing the operation of the power source 21 for the positive and the negative trigger pulses, it will be seen that the polarities of a first and a second current appearing at a first terminal pair consisting of the collector of the transistor 211′ and ground and at a second output terminal pair consisting of the collector of transistor 216 and ground, respectively, are both simultaneously reversed to maintain the opposite-polarity relation therebetween.

Therefore, by using the same notations as in Equations 1–9 for the device of FIG. 1, the current $i$ in the embodiment of FIG. 2 is given (instead of Equation 8 by $$i = \pm [hI/(1+h)] \cdot [x/((1+h)-hx)] \qquad (10)$$

The second term in the right-hand side of Equation 8 has now been cancelled by the compensating current flowing through the compensating circuit comprising the fixed-admittance network and elements 25 and 27 and from the output-signal utilization circuit 13.

Nearly the same values as those for the device of FIG. 1 may be set for the voltages of the power or voltage sources 213, 214, 218, 219, and 210, the admittances $g_m$ and $G_0$, the currents I and $i$, and the parameter $h$.

As has been explained hereinabove, the reversible constant-current power source 21 can produce not only the reversible power current but also the compensating current which has both an absolute value and a polarity which compensates for the second term in the right-hand side of the Equation 8. This is so even though the analogue quantity represented by the digital signal supplied from the signal source 14 is positive or negative. Thus, it may be said that this reversible constant-current power source 21 makes it possible to provide a decoder having a bipolar hyperbolic companding characteristic which is also very simple in construction. As has been described with reference to FIG. 1, it is possible to not only make power current I small but also to make the compensating current $I/(1+h)$ very small. As a result, high stability is assured for the output currents of the constant-current power source 21.

While the invention has been explained hereinabove in conjunction with an embodiment thereof, it should be understood that this description does not impose any restriction on the technical scope of the invention and that many variations and modifications are possible within the scope thereof. For instance, the transistor circuitry employed in the reversible constant-current power source 21 may be replaced with electron-tube circuitry, or other circuitry employing any kind of active circuit elements. Also, the illustrated combination of the admittance elements and the switches in the variable-admittance network may be modified as desired, provided the network provides the linearity of admittance variation. Furthermore, the embodiment is not solely applicable to binary codewords. It is just as applicable to quaternary or any other codeword if minor modifications are made to the circuitry.

While I have described above the principles of my invention in connection with specific embodiments, it is to be clearly understood that this description is made only by way of example, and not as a limitation to the scope of my invention as set forth in the objects thereof and in the accompanying claims.

What is claimed is:

1. A bipolar signal converting device for converting a coded input signal containing polarity data and supplied by an input source into a coded non-linear output signal comprising: a variable admittance network, a branch circuit including a fixed admittance circuit and a utilization circuit connected in series, said branch circuit being connected in shunt with said network; means connecting said input source to said network for controlling the admittance thereof in accordance with the input information; a reversible current source connected to receive said input signals, for supplying a D.C. current to said parallel connected network and branch circuit, said current source supplying a first current flowing in a first sense in response to given polarity data and supplying a second current flowing in a sense opposite said first sense in response to other polarity data.

2. A bipolar signal converting device as set forth in claim 1 wherein said reversible current source generates both said first and second currents simultaneously and wherein compensating circuit means are provided and connected to supply at least a portion of said second current to said utilization circuit to cancel any D.C. component contained in the current flowing through said fixed admittance circuit to said utilization circuit.

3. A bipolar signal converting device as set forth in claim 2 wherein the current source includes switch means controlled by said input signals for supplying said first current to said network in a first sense in response to given polarity data and for supplying said first current to said network in a sense opposite said first sense in response to other polarity data.

4. A bipolar signal converting device as set forth in claim 2 wherein the current source is provided with two pairs of output terminals which are respectively supplied with said first and second currents.

5. A bipolar signal converting device as set forth in claim 2 wherein the fixed admittance circuit is a single fixed admittance element and wherein the admittance of said variable network varies linearly in response to the input signals supplied thereto.

6. A bipolar signal converting device as set forth in claim 2 wherein the input signal source supplies digital codewords representative of analogue quantities and wherein at least one element of each codeword represents the polarity of the analogue quantity.

7. A bipolar signal converting device as set forth in claim 6 wherein a polarity sensing circuit is provided and connected between said input source and said current source to sense the polarity represented by said polarity indicating elements and to control said current source to generate said first and second currents in response to the thus sensed polarity.

8. A decoder comprising: a variable admittance network; a branch circuit including a fixed admittance circuit and a utilization circuit connected in series, said branch circuit being connected in shunt with said network; a digital input signal source for supplying data including polarity information, said input source being connected to said network to control the admittance thereof in accordance with the supplied digital information; a reversible current source connected to said input signal source and responsive only to said polarity data in said input digital signals for simultaneously generating first and second currents which flow in opposite senses to each other; and means for supplying different ones of said currents to the parallel connected variable impedance network and branch circuit in response to different polarity data.

9. A decoder as set forth in claim 8 wherein compensating means are provided for supplying at least a portion of said second current to said utilization circuit to cancel the DC component contained in the current flowing to said utilization circuit through said fixed impedance circuit, the amplitude of said DC component being determined by the admittance of said variable admittance network, said fixed admittance circuit and the admittance of said utilization circuit.

10. A decoder as set forth in claim 9 wherein the input digital signals linearly vary the admittance of said variable admittance network in accordance with the digital content of said input signals.

11. A decoder as set forth in claim 9 wherein the current source is controlled by said input signals to supply said first current to the parallel connected variable admittance network and branch circuit in a first sense in response to given polarity data and to supply said first current to said parallel connected network and branch circuit in a sense opposite said first sense in response to other polarity data.

12. A decoder as set forth in claim 9 wherein the current source is provided with two pairs of output terminals which are respectively supplied with said first and second currents.

13. A decoder as set forth in claim 12 wherein the current source comprises: first, second, third and fourth transistors, the emitter electrodes of said first and second transistors being interconnected, the emitter electrodes of said third and fourth transistors being interconnected; the collector electrodes of said first and third transistors being interconnected and the collector electrodes of said second and fourth transistors being interconnected; a first energy source connected in a given sense between the base electrodes of said first and third transistors; a second energy source connected in said given sense between ground and the base electrode of said second transistor, said second energy source also being connected to supply energy in said given sense to the junction between said interconnected emitter electrodes of said first and second transistors; a third energy source connected in a sense opposite said given sense, between ground and the base electrode of said fourth transistor, said third energy source also being connected to supply energy in said opposite sense to the junction between said interconnected emitter electrodes of said third and fourth transistors; and wherein the output terminal pair for said first current consists of a grounded terminal and a terminal connected to the interconnected collector electrodes of said second and fourth transistors; and wherein the output terminal pair for said second current consists of said grounded terminal and a terminal connected to the interconnected collector electrodes of said first and third transistors.

14. A decoder as set forth in claim 9 wherein the fixed admittance circuit is a single fixed admittance element.

15. A decoder as set forth in claim 9 wherein the input signal source supplies digital codewords representative of analogue quantities and wherein at least one element of each codeword represents the polarity of the analogue quantity.

16. A decoder as set forth in claim 15 wherein a polarity sensing circuit is provided and connected between said input source and said current source for sensing the polarity represented by said polarity indicating elements and for generatng an output signal which controls said current source to generate said first and second currents in response to the thus sensed polarity.

17. A compander comprising a variable admittance network, a branch circuit including a fixed admittance circuit and a utilization circuit connected in series, said branch circuit being connected in shunt with said network, said network and said branch circuit both being grounded; a digital input signal source connected to said network to control the admittance thereof in accordance with the supplied digital information, a constant current source connected to the junction between the parallel connected network and branch circuit whereby the variation in the admittance of said network in accordance with the supplied input information varies the current flowing from said constant current source through the branch circuit including the utilization means and means for cancelling the DC component in the current flowing through said utilization circuit.

References Cited

UNITED STATES PATENTS

| | | | |
|---|---|---|---|
| 3,223,993 | 12/1965 | Dahlberg | 340—347 |
| 3,241,133 | 3/1966 | Herzl | 340—347 |
| 3,296,611 | 1/1967 | Kaneko | 340—347 |
| 3,298,017 | 1/1967 | Avignon et al. | 340—347 |
| 3,305,855 | 2/1967 | Kaneko | 340—347 |
| 3,310,799 | 3/1967 | Ohashi | 340—347 |
| 3,336,589 | 8/1967 | Kaneko | 340—347 |

MAYNARD R. WILBUR, *Primary Examiner.*

W. J. KOPACZ, *Assistant Examiner.*